United States Patent
Wood et al.

(10) Patent No.: US 11,888,641 B1
(45) Date of Patent: Jan. 30, 2024

(54) DYNAMIC PROVISIONING OF IOT DEVICES FROM AN ONLINE APPLICATION MARKETPLACE

(71) Applicant: Roku, Inc., San Jose, CA (US)

(72) Inventors: Anthony Wood, San Jose, CA (US); David Stern, San Jose, CA (US); Sunil Ramesh, Cupertino, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/932,456

(22) Filed: Sep. 15, 2022

(51) Int. Cl.
*H04L 12/28* (2006.01)

(52) U.S. Cl.
CPC ........ *H04L 12/281* (2013.01); *H04L 12/2816* (2013.01); *H04L 2012/284* (2013.01)

(58) Field of Classification Search
CPC .............. H04L 12/281; H04L 12/2816; H04L 2012/284
See application file for complete search history.

(56) References Cited

U.S. PATENT DOCUMENTS

| | | | |
|---|---|---|---|
| 9,772,617 B2* | 9/2017 | Kreft ................... | G05B 19/056 |
| 10,291,603 B2* | 5/2019 | Robinson .............. | H04L 9/3263 |
| 10,616,093 B2* | 4/2020 | Jadhav ................. | H04L 45/121 |
| 11,038,841 B2* | 6/2021 | Palnati ................ | H04L 63/0823 |
| 11,683,235 B2* | 6/2023 | Hayes ................ | H04W 74/085 |
| | | | 370/254 |
| 2008/0240078 A1* | 10/2008 | Thubert ............... | H04W 40/08 |
| | | | 370/406 |
| 2011/0269484 A1* | 11/2011 | Cazanas .................. | H04L 67/34 |
| | | | 455/466 |
| 2014/0244834 A1* | 8/2014 | Guedalia ................ | H04W 4/08 |
| | | | 709/224 |
| 2016/0323863 A1* | 11/2016 | Park ........................ | H04W 4/70 |
| 2017/0295258 A1* | 10/2017 | Raleigh ................... | H04L 67/02 |
| 2018/0324225 A1* | 11/2018 | Azim .................. | H04L 65/1076 |

(Continued)

OTHER PUBLICATIONS

Yus et al., "The SemIOTic Ecoystem: A Semantic Bridge between IoT Devices and Smart Spaces" ACM Transactions on Internet Technology, vol. 22, Issue 3, Article No. 76, pp. 1-33, Jul. 25, 2022.*

(Continued)

*Primary Examiner* — Todd L Barker
(74) *Attorney, Agent, or Firm* — McDonnell Boehnen Hulbert & Berghoff LLP

(57) ABSTRACT

A method for provisioning a group of devices with control-group data defining one or more functional interrelationships between the devices. The method includes providing a GUI defining an online application marketplace, the GUI specifying multiple applications available for download, each application including a different respective set of control-group data defining a different respective set of one or more functional interrelationships. Further, the method includes receiving user input selecting a given one of the applications, the selected application defining given control-group data defining a given set of one or more functional interrelationships. And the method includes responsively (i) downloading the selected application and (ii) provisioning the devices of the group with the given set of control-group data, the provisioning establishing the given set of one or more functional interrelationships between the devices of the group.

20 Claims, 9 Drawing Sheets

(56) References Cited

U.S. PATENT DOCUMENTS

| | | | | |
|---|---|---|---|---|
| 2018/0331940 A1* | 11/2018 | Jadhav | ............... | H04L 45/121 |
| 2019/0036725 A1* | 1/2019 | Gould | ............... | H04L 12/2816 |
| 2019/0110111 A1* | 4/2019 | Huske | ............... | H04N 21/4524 |
| 2020/0244297 A1* | 7/2020 | Zalewski | ............. | H04W 76/10 |
| 2020/0389775 A1* | 12/2020 | Ravichandran | ......... | H04W 4/60 |
| 2020/0404513 A1* | 12/2020 | Hayes | ................ | H04W 48/10 |
| 2022/0030066 A1* | 1/2022 | Govindaraju | ........... | H04L 67/12 |

OTHER PUBLICATIONS

Yun et al. "TTEO (Things Talk to Each Other(: Programming Smart Spaces Based on IoT Systems", Apr. 2016, 20 pages total.*

* cited by examiner

DYNAMIC PROVISIONING OF IOT DEVICES FROM AN ONLINE APPLICATION MARKETPLACE

SUMMARY

Modern customer premises, such as homes, hotels, or offices, are increasingly equipped with many devices that are configured to engage in digital communications. These devices may range from traditional internet-connected equipment such as personal computers, telephone systems, security systems, gaming systems, and over-the-top (OTT) streaming media players, to newer equipment including "smart home" devices such as connected appliances, utilities, lights, switches, power outlets, and speakers, as well as wearable devices such as watches and/or health monitors, among countless other examples.

A home or other customer premises could contain a collection of devices that can be dynamically configured to communicate with each other in order to carry out useful functions. These devices could function statically or dynamically as sensors, controlling devices (e.g., controls), and controlled devices, among other possibilities. Without limitation, for instance, sensors could include devices for sensing environmental state such as motion, vibration, water, temperature, smoke, heat, pressure, wind, or the like. Controlling devices could include devices for controlling other devices and could possibly include user input mechanisms to facilitate the controlling, such as switches, buttons, knobs, or the like. And controlled devices could include devices that could be controlled by controlling devices, such as power outlets, lightbulbs, fans, speakers, furniture, or the like. Further, the collection of the devices may include some devices that carry out other functions, such as repeating signals between other devices and/or downloading device logic, among other possibilities, and that may or may not also function as sensors, controlling devices, or controlled devices.

The devices in the collection could be considered or referred to as "Internet of Things" (IoT) devices, regardless of whether they can or do communicate on the "internet".

These devices could be logically divided into control groups, which may or may not be mutually exclusive (i.e., may or may not share at least one device in common). (Without limitation, an example such control group may consist of devices that are physically co-located with each other, such as devices in a given room or living area.) Each control group could define one or more functional interrelationships between its included devices. For example, a control group containing a switch and a lightbulb may define a functional interrelationship between the switch and the lightbulb, establishing that the switch controls the on/off/dimming state of the lightbulb. As another example, a control group containing a motion sensor, a switch, and a lightbulb may define a functional interrelationship between the motion sensor and the switch, establishing that the motion sensor would send a trigger message to the switch upon detecting motion, and may further define a functional interrelationship between the switch and the lightbulb, establishing that the switch controls the state of the lightbulb. Numerous other control groups and functional interrelationships could be possible as well.

Further, there may or may not be a router or the like that manages or facilitates communication between these devices. The devices may be capable of engaging in direct or mesh network communication with each other without a need for a router or the like. For instance, the devices could be arranged with soft-wiring rather than fixed inter-device connections, which may enable devices to be added and removed on the fly.

Regardless, there may also be no central controller/hub responsible for coordinating respective operation of the devices. Rather, the devices of the collection may possess distributed state, netlist, and control logic information to facilitate their operation and interoperation. In IoT arrangements that include a central hub, the hub would be programmed with logic that dictates how to respond to signals from various devices such as controlling devices, sensors, or the like, and the hub would accordingly respond by signaling in turn to one or more other devices to trigger particular actions. Omitting that central hub, the devices of the present collection could themselves be programmed with such logic to take action without guidance from a central hub. Alternatively, there may be a central controller/hub.

By way of example, consider a control group including a switch and a lightbulb. With an IoT arrangement including a central hub, the switch may respond to user input by outputting a toggle or up/down control signal to the hub, and the hub may programmatically generate and provide an associated control command to the lightbulb. Whereas, by omitting that hub, the switch itself may respond to the user input by programmatically generating and providing an associated control command to the lightbulb. Other examples could be possible as well.

The devices of the collection may maintain and share with each other a set of operational data, including state, netlist, and control logic for instance.

By way of example, devices within a given control group may share with each other a set of operational data pertinent to the control group. For instance, a control group G1 consisting of a switch S1 and a lightbulb L1, with S1 set to control L1, may have (i) state information defining the on/off/dim state of L1, (ii) netlist information defining the identifiers (e.g., network addresses) and interrelationship between S1 and L1, and (iii) control logic executable by S1 to carry out switch operations and control logic executable by L1 to carry out lightbulb operations.

Whenever this control group's set of operational data changes, optimally each device in the control group could be updated to reflect the changed operational data, so that each device in the control group would maintain an up-to-date copy of the control group's set of operational data. For example, if the on/off/dim state of L1 changes, L1 may report its new state to S1, or S1 may otherwise learn of that updated state, and both L1 and S1 may thus have a record of that updated state. As another example, if S1 receives or otherwise experiences a change of control logic, S1 may report that changed control logic change to L1, or L1 may otherwise learn of that changed control logic, and both S1 and L1 may thus have a record of their own control logic and each other's respective control logic. And as yet another example, if a new device gets added to the control group, the netlist stored by S1 and L1 could get updated accordingly, and the new device could receive and store the operational data of the control group as well.

Further, control groups could share their operational data with each other, so that devices in one control group may store not only operational data that is pertinent to their own control group but also operational data that is not pertinent to their own control group but that is pertinent to each of one or more other control groups. For instance, given two control groups G1 and G2, with group G1 consisting of a first switch S1 and a first lightbulb L1, and group G2 consisting of a second switch S2 and a second lightbulb L2, group G1 and group G2 could share their respective operational data with each other. Namely, the devices of group G1 may store not only the operational data of group G1 but also the operational data of group G2, and the devices of group G2 may store not only the operational data of group G2 but also the operational data of group G1.

With this arrangement, whenever the operational data of either such control group changes, not only would the devices of that control group be updated to reflect the changes, but the devices of the other control group could be updated to reflect the changes as well, so that both control groups would have an up-to-date record of its own operational data of the other control group's operational data. For example, when S1 changes the on/off/dim state of L1, not only would S1 and L1 both record that updated state, but S1 and/or L1 may also report the change of state to S2 and L2, or S2 and L2 may otherwise learn of that updated state, so that both control groups would have a record of their own operational state and the operational state of the other control group.

This sharing of operational data among devices of the collection of devices could offer many advantages. Without limitation, for instance, this arrangement could facilitate quick and convenient restoration of operational data after devices or control groups have experienced a loss-of-connectivity event, an out-of-service event, or another failure event. For instance, with the two example groups noted above, if the devices of group G1 lose power and/or otherwise lose their records of operational data, once they come back online, they could engage in a discovery process, broadcasting probe messages or the like to which one or more devices in group G2 may respond by providing the latest operational data including operational data pertinent to group G1, and the devices of G1 could thus receive and store that operational data and continue operating like they were before they experienced the failure event. Other examples are possible as well.

In an IoT system such as this, control group pairings between controlling devices and controlled devices could be statically defined. Namely, a given controlling device could be set to control a given controlled device or set of controlled devices. This may be the case particularly for a simple controlling device such as a switch or button. Such a system could be set with static pairing between that simple controlling device and a particular controlled device or set of controlled devices, so that the system would respond to user engaging of that simple controlling device by adjusting the state of the statically-associated controlled device(s). For instance, the system may be set with static pairing between a toggle switch and a lightbulb or group of lightbulbs, so that the system would respond to user pressing of that toggle switch by toggling the on/off state of that particular lightbulb or group of lightbulbs.

However, this static pairing of a controlling device with controlled device(s) could be limiting. While it may be useful to have a controlling device control a given controlled device in certain situations, it may also be desirable to have that same controlling device control a different controlled device in other situations (or, for that matter, to have that same controlling device be completely detached in other situations). Namely, it may be desirable to effectively decouple controlling devices and controlled devices, allowing more liberal and dynamic control-group pairing.

Devices of the present collection could be arranged to achieve this by being programmed to dynamically change their control group pairings based on time and/or location. By way of example, a simple controlling device such as a switch or button could be programmed to control one controlled device or another based on a determination of what the current time of day is and/or based on a determination of what the controlling device's current location is. Alternatively, other control logic, possibly separate from the devices at issue, could operate to change the control group pairings based on time and/or location.

Without limitation, for instance, a simple controlling device could be programmed to respond to user input by determining the current time of day and/or the controlling device's current location and using the determined time of day and/or determined location as a basis to select which of multiple controlled devices to control. If the controlling device determines that the time of day is a first time of day rather than a second time of day and/or that the controlling device's location is a first location rather than a second location, then, based at least in part on that determination, then the controlling device may select a first controlled device to control in response to the user input and may therefore responsively control that selected first controlled device rather than a second controlled device. Whereas, if the controlling device determines that the time of day is the second time of day rather than the first time of day and/or that the controlling device's location is the second location rather than the first location, then, based at least in part on that determination, then the controlling device may select the second controlled device to control in response to the user input and may therefore responsively control that selected second controlled device rather than the first controlled device.

As a specific example of this process, the simple controlling device may be arranged to receive primitive input such as a button press and to respond to that primitive input by selecting, based on time and/or location, which of multiple lightbulbs the controlling device should control. Based on this selection, the controlling device may then responsively engage in a process to control the selected lightbulb(s). Similar logic could also be applied to dynamically vary what action gets taken in response to such primitive input, such as whether to toggle the on/off state of a lightbulb or rather to change the color or brightness of the lightbulb, among other possibilities, or to dynamically establish that no action would be taken in response to such primitive input.

The devices of the collection could be provisioned with control group pairings and associated control logic in various ways. Without limitation, for instance, the devices could be dynamically provisioned by an application downloaded from an online application marketplace, with the application establishing pairings and/or other operational data defining functional interrelationships between the devices.

An example device of or associated with the collection may also provide or be interconnected with a user interface such as a television and may engage in broadband communication with a cloud-based computing system that provides an online application marketplace listing IoT applications available for download. These IoT applications, which may be provided by third-party application developers, may each define respective functional operations and interoperations of devices in a manner that could be mapped to devices in the present collection.

Through interaction with the user interface, a user could trigger download (e.g., purchase and download) of a desired IoT application to the example device. And upon download of that application, the example device may then distribute part or all of the application directly or indirectly to various devices of the collection. This process could result in dynamically provisioning each of multiple devices of the collection with associated operational data such as control-group pairings, control logic, and state information, in accordance with the application.

In an example implementation, the user may obtain (e.g., purchase) the various devices defining at least a portion of the collection of devices, such as one or more sensors, controlling devices, and controlled devices. Further, the user may then cause a device to download from the online application marketplace an IoT application for the acquired devices, and operational data of that application may then propagate to the various devices, to provision them to operate as defined by the application.

For instance, a user may acquire devices suitable for use in a security system, such as motion sensors, door sensors, cameras, lights, and the like. Standing on their own, those devices may not interoperate with each other or may only interoperate with each other in a basic manner. Further, the user may browse the online application marketplace and download an application developed by a particular security-system provider. Upon download, operational data of that application may then propagate to the various acquired devices, provisioning the devices to interoperate with each other in a manner defined by the application, so that the devices could then function cooperatively as a useful security system.

Further, when a device interacts with the cloud-based computing system to present a user interface of the online application marketplace, the device may convey to the cloud-based computing system a record of what devices are currently present in the collection. The cloud-based computing system may then advantageously use that information as a basis to present in the user interface just those IoT applications that would be compatible with the indicated devices. For example, if the only devices present in the collection are specifically security-system components, then the cloud-based computing system may present in the user interface just security-system IoT applications. As another example, if the devices present in the collection are just devices of a particular brand or other characteristic, then the cloud-based computing system may present in the user interface just IoT applications that are compatible with that brand and/or other characteristic.

These as well as other aspects, advantages, and alternative will become apparent from reading the following detailed description with reference where appropriate to the accompanying drawings. Further, it should be understood that the implementations described in this summary and in the following description and drawings are intended as examples only and that numerous variations could be possible.

DETAILED DESCRIPTION

Example implementations will be described in the context of example customer premises such as a home. It will be understood, however, that the disclosed principles could apply as well with respect to other customer premises, including without limitation as any facility where people might reside, work, visit, or otherwise be present.

It will also be understood that the arrangements and processes described could take various other forms. For instance, elements and operations could be re-ordered, distributed, replicated, combined, omitted, added, or otherwise modified. In addition, elements described as functional entities could be implemented as discrete or distributed components or in conjunction with other components/modules, and in any suitable combination and location. Further, various operations described as being carried out by one or more entities could be implemented by and/or on behalf of those entities, through hardware, firmware, and/or software, such as by one or more processing units executing program instructions stored in memory, among other possibilities.

Figure 1:
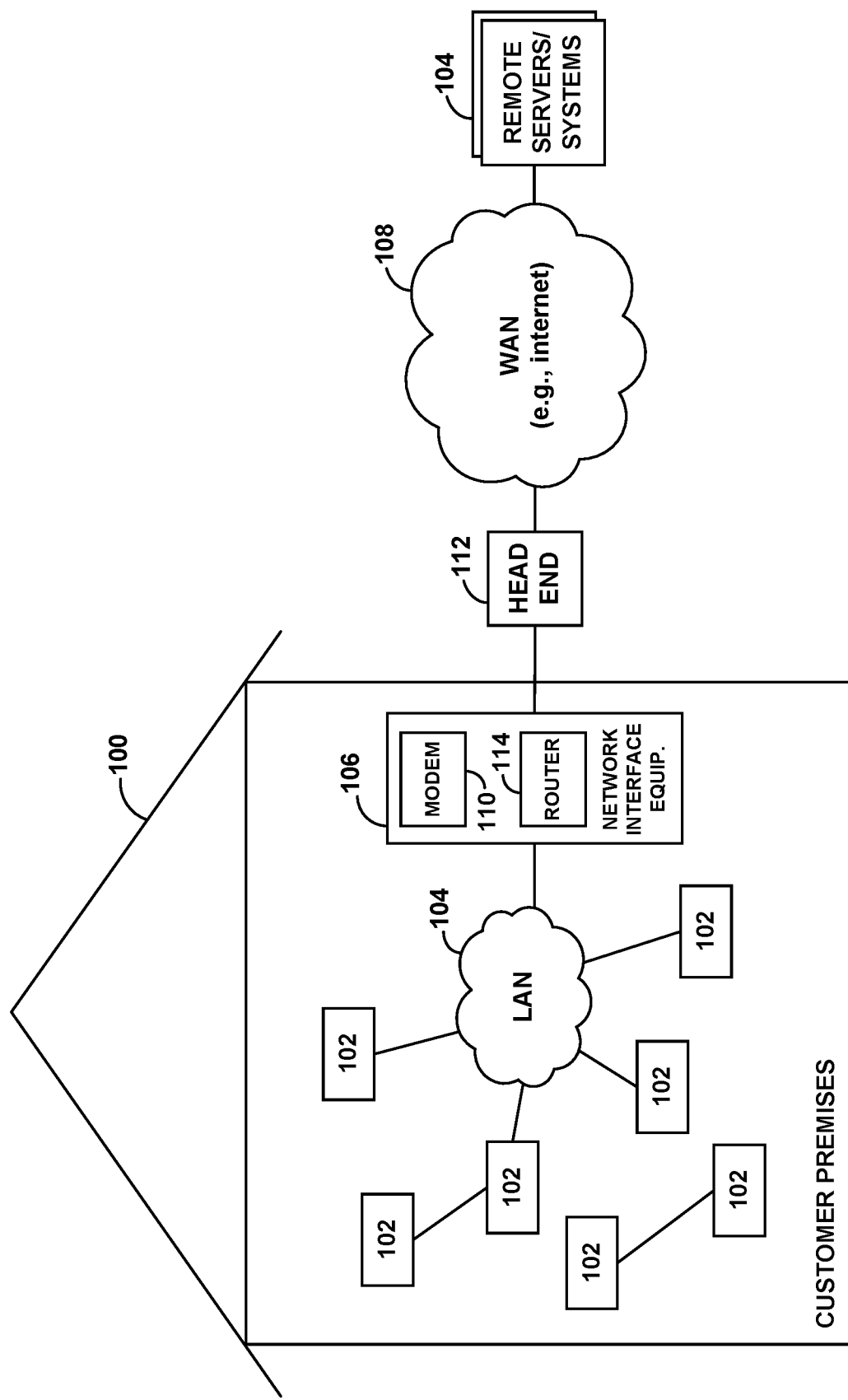
FIG. 1 is a simplified block diagram illustrating an example arrangement in which disclosed principles could be implemented.

Referring to the drawings, as noted above, FIG. 1 is a simplified block diagram illustrating an example arrangement in which various disclosed principles could be implemented. As shown in FIG. 1, the example arrangement includes, at example customer premises 100, a collection of multiple devices 102 that could be configured to operate as described herein. In a scenario where the customer premises 100 comprises a house or another structure, one or more of these devices 102 could be located physically within that structure, and/or one or more of the devices 102 could be located outside of the structure, such as in an adjoining or nearby area for instance.

To facilitate operations such as those noted above, various ones of the devices 102 of the collection could be configured to communicate with each other. This communication could occur in any of a variety of ways, through wireless and/or wired physical connections, and through direct peer-to-peer connections and/or network connections. Further, the communication could make use of soft-wiring, enabling devices to be added and removed on the fly, without the need for statically defined connections between each other.

Without limitation, for instance, FIG. 1 shows some of the devices 102 sitting as nodes on a local area network (LAN) 104. LAN 104 could be a centralized network having a router or the like to manage device connections and routing of data, or LAN 104 could be a decentralized network (e.g., a wireless ad-hoc network), which may be self-configuring as devices enter or leave the network, and in which routing of data may occur more dynamically based on network connections and routing algorithms. Alternatively or additionally, as further shown, some of the devices 102 may have direct rather than networked connections with each other.

To support this or other such inter-device communication, each device 102 of the collection could include one or more communication modules and associated communication logic. For instance, each device 102 could include a wireless communication module, such as a WiFi, BLUETOOTH, or ZIGBEE module, and/or a wired communication module such as an Ethernet or Powerline network adapter, and could include a processor programmed with an associated communication stack and/or other logic that governs its communications.

Through manual or automated processes using these modules, the devices 102 may acquire connectivity that would allow them to then engage in direct or indirect communication with each other. For instance, the devices 102 may broadcast signals advertising their presence and may likewise discover presence of other devices 102 and/or network infrastructure, and the devices 102 may engage in control signaling to establish direct pairings with other devices 102 and/or to obtain network address assignments that allow them to engage in network communication with each other. Further, some manual setup may be involved in establishing these or other device connections.

FIG. 1 also illustrates the example customer premises 100 including network interface equipment 106 that provides the customer premises 100 with a connection that may enable one or more of the devices 102 to communicate on a wide area network (WAN) 108 such as the internet. In an example implementation, the network interface equipment 106 could include a cable, satellite, cellular, or other WAN modem 110 configured to connect with an associated head end (e.g., cable or satellite head end or cellular core network) 112 that provides WAN connectivity, and could further include a router 114 that may manage communications between various devices 102 and enable various devices 102 to communicate on the WAN 108.

With this example arrangement, when the WAN modem 110 is initially powered on, the modem 110 may register its presence with the head end 112, and the head end 112 may assign to the modem 110 a globally-routable Internet Protocol (IP) address for use to engage in communications on the WAN 108, or the modem 110 may have a statically-assigned globally-routable IP address. Further, as a device 102 initially powers on, the device 102 may register its presence with the router 114, and the router 114 may assign to the device a locally-routable IP address for use to engage in communication on the LAN 104, or the device may have a statically-assigned locally-routable IP address. The device 102 may then engage in WAN communications through the router 114, modem 110, and WAN connection, with the router performing standard network address translation between the device's local IP address and the modem's global IP address.

Figure 2:
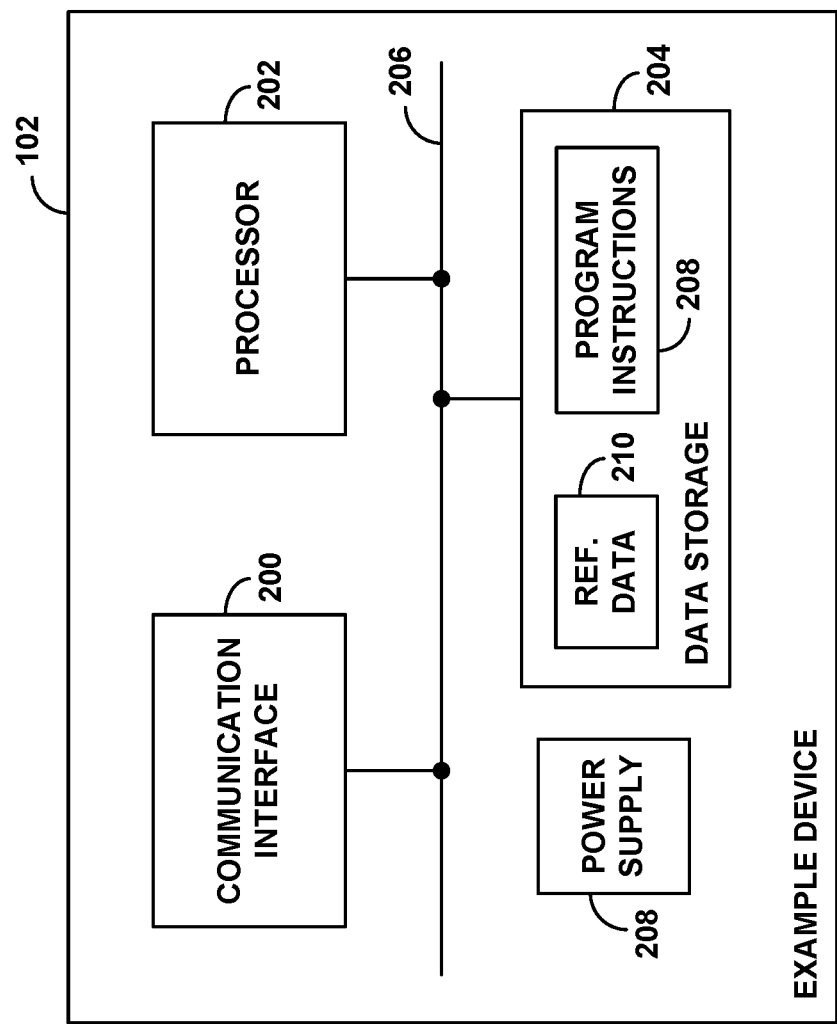
FIG. 2 is a simplified block diagram illustrating example components of an example device.

FIG. 2 is a simplified block diagram illustrating components of an example device 102. As shown in FIG. 2, the example device 102 includes a communication interface 200, a processor 202, data storage 204, all of which may be communicatively linked together by a system bus, network, or other connection mechanism 206 and/or integrated together in various ways. Further, the example device 102 includes a power supply 208, such as a direct or alternating current input or battery, which could supply power to drive various other components of the device 102. Depending on its type, the device may include various other components.

The communication interface 200 could include one or more communication modules such as wireless and/or wired interfaces and associated logic to facilitate communication with other devices in the collection and, if applicable, to facilitate communication on the WAN 108, in accordance with any of the protocols noted above, among other possibilities. For instance, the communication interface 200 could include one or more wireless communication modules with one or more associated antennas, and/or one or more wired Ethernet modules.

The processor 202 could comprise one or more general purpose processors (e.g., microprocessors) and/or one or more special purpose processors (e.g., application specific integrated circuits). Further, the data storage 204 could comprise one or more non-transitory storage components, such as optical, flash, magnetic, RAM, ROM, or other storage, possibly integrated in whole or in part with the processor 202. As shown, the data storage could hold or be configured to hold program instructions 208 and reference data 210. The program instructions 208 could define or constitute controller code, which could be executable or interpretable by the processor 202 to cause the device 102 to carry out various device operations described here. And the reference data 210 could include data useable by the device 102 to facilitate carrying out various operations. For instance, the reference data could include some of the operational data noted above, among other possibilities.

The devices 102 of the collection may be of various types, including but not limited to sensors, controlling devices, controlled devices, and other devices such as repeaters and advanced user-interface devices including personal computers, mobile phones, tablets, smart watches, wearable devices, gaming devices, and OTT devices, for instance. Further, some devices 102 may be of multiple types. For instance, a device may function as both a controlled device and a repeater, as both a sensor and a controlling device, or as both an OTT device and a controlling device, among other possibilities.

Sensors could function to sense state. As noted above, for instance, sensors could include devices for sensing motion, vibration, water, smoke, heat, pressure, wind, or the like. Sensors could include known components that enable them to threshold state conditions and to trigger responsive action. For example, a sensor could be configured to sense when the level of motion, vibration, water, smoke, or other state in its environment reaches a predefined threshold level, and to responsively output a signal to a paired controlling device, to trigger associated action by the controlling device.

Controlling devices could function to control other devices and/or to take other control action. Controlling devices could include human-interface components, for receiving user input to trigger control action. For instance, a controlling device could include one or more switches, buttons, knobs, touch screens, microphones, or other components. Some such components could be configured to receive primitive user input such as the tapping or pressing of a button, the toggling of a switch, or the sliding of a slider, among other possibilities. Other such components could be configured to receive more complex user input, such voice input, parameter specifications, or the like. Further, controlling devices could be configured to receive input from sensors, indicating sensed state, and/or to detect or otherwise learn of context. And controlling devices could be configured to respond to such input, context, or the like, by engaging in control operations, such as outputting signaling to one or more controlled devices to change operational state or otherwise trigger controlled-device action.

Controlled devices could then function to be controlled by controlling devices. As noted above, examples of controlled devices could include power outlets, lightbulbs, fans, speakers, or the like. Controlled devices could be configured to receive control signals from controlling devices and to respond to the control signals by changing their state. For instance, a power outlet may be configured to receive a control signal from a switch and to respond to the control signal by toggling between outputting power or not. As another example, a lightbulb may be configured to receive a control signal from a switch and to respond to the control signal by toggling between on and off state, changing the brightness or color of its emitted light, and/or taking one or more other actions indicated by the control signal, among other possibilities.

OTT devices could function to facilitate OTT media services. Without limitation, an OTT device could be an OTT streaming media player, which could be integrated or connected with a display such as a television and could interwork with various servers operated by an OTT provider (e.g., a virtual multichannel video programming distributor (virtual MVPD)), to facilitate receiving and playing of streaming media content. An OTT device may also be configured to receive from the OTT provider and to present on the display a graphical user interface (GUI) defining a menu of available streaming media channels, available content items, settings, and other options. Further, the OTT device may be configured to allow a user to navigate through the GUI (e.g., using a remote control) and to provide input that the OTT device could convey to the OTT provider to trigger actions such as controlling selection and streaming of media content.

Each of these and/or other devices 102 at the customer premises 100 may have one or more identifiers that may uniquely identify the device among the collection of devices at the customer premises, and that may facilitate communication among the devices. For instance, each device could have a permanent or semi-permanent hardware address, such as a Media Access Control (MAC) address or other identifier, and the devices may communicate with each other by addressing communications to their respective MAC addresses. Further or alternatively, each device may have a network address, such as a local IP address as noted above, and the devices may communicate with other by addressing communications to their respective network addresses.

Each device 102 may also have respective configuration and capability information, which the device may store in its data storage. This information may include, without limitation, the device's type, brand, model number, and various supported capabilities of the device. For example, if the device is a smart lightbulb made by a particular manufacturer, this information may include an indication that the device is a controlled device, an identity of its manufacturer, a model number the device, and specifications of capabilities such as ability to turn on off and to change light color and brightness, etc. A device may store this information as extensible markup language (XML) data, as a feature bit string, and/or in another form. It may also be possible to determine the configuration and capability information of a given device by a lookup keyed to an identifier of the device.

As noted above, various devices 102 at the customer premises 100 could be grouped into control groups, which could define functional interrelationships between the devices, such as which devices will respond to and/or trigger action by which other devices (e.g., which sensors will provide sensed information to which controlling devices, which controlling devices will control which controlled devices, etc.), and how so. Each control group could consist of two or more devices, so there could be one or more functional interrelationships between the devices in a control group.

Each device in a control group could store control-group data for the control group as a whole, also perhaps as XML data and/or in another form. This control-group data could specify which devices are members of the control group and could define one or more interrelationships between the devices in the control group. For instance, the control-group data could include, respectively per device, control logic such as program instructions or scripting that defines how the device will interoperate with the one or more other devices of the control group. Further, the control-group data could specify the operational state of each of one or more devices in the control group, particularly of any device whose state could change from time to time.

For instance, consider a control group G1 that includes a motion sensor M1, a switch S1, and a lightbulb L1, where M1 is to notify S1 upon detecting a threshold motion, and S1 is to turn on L1 in response to primitive user input and/or in response to the notification from the M1. In that scenario, each device in group G1 may store an XML document that includes control-group data identifying the members of group G1 as M1, S1, and L1, that specifies for each group member a set of program logic useable respectively by the group member to carry out the operations that the group member is to carry out, and that specifies the on/off/dim state of L1. For example, the control-group data for group G1 could specify the hardware and/or network address respectively of each of M1, S1, and L1. Further, the control-group data could include (i) for M1, program logic executable by a processor of M1 to cause M1 to generate and transmit to S1 a notification signal upon detecting the threshold motion, (ii) for S1, program logic executable by a processor of S1 to cause S1 to transmit a control signal to L1 in response to the primitive user input and/or in response to the notification from M1, and (iii) for L1, program logic executable by a processor or L1 to cause L1 to respond to the control signal by transitioning from an off state to an on state, and also a record of the on/off/dim state of L1.

The devices 102 at the customer premises 100 could be provisioned into control groups with associated interrelationships, through various processes, such as by user design, download of application logic, and/or manual pairing, among other possibilities.

Figure 3:
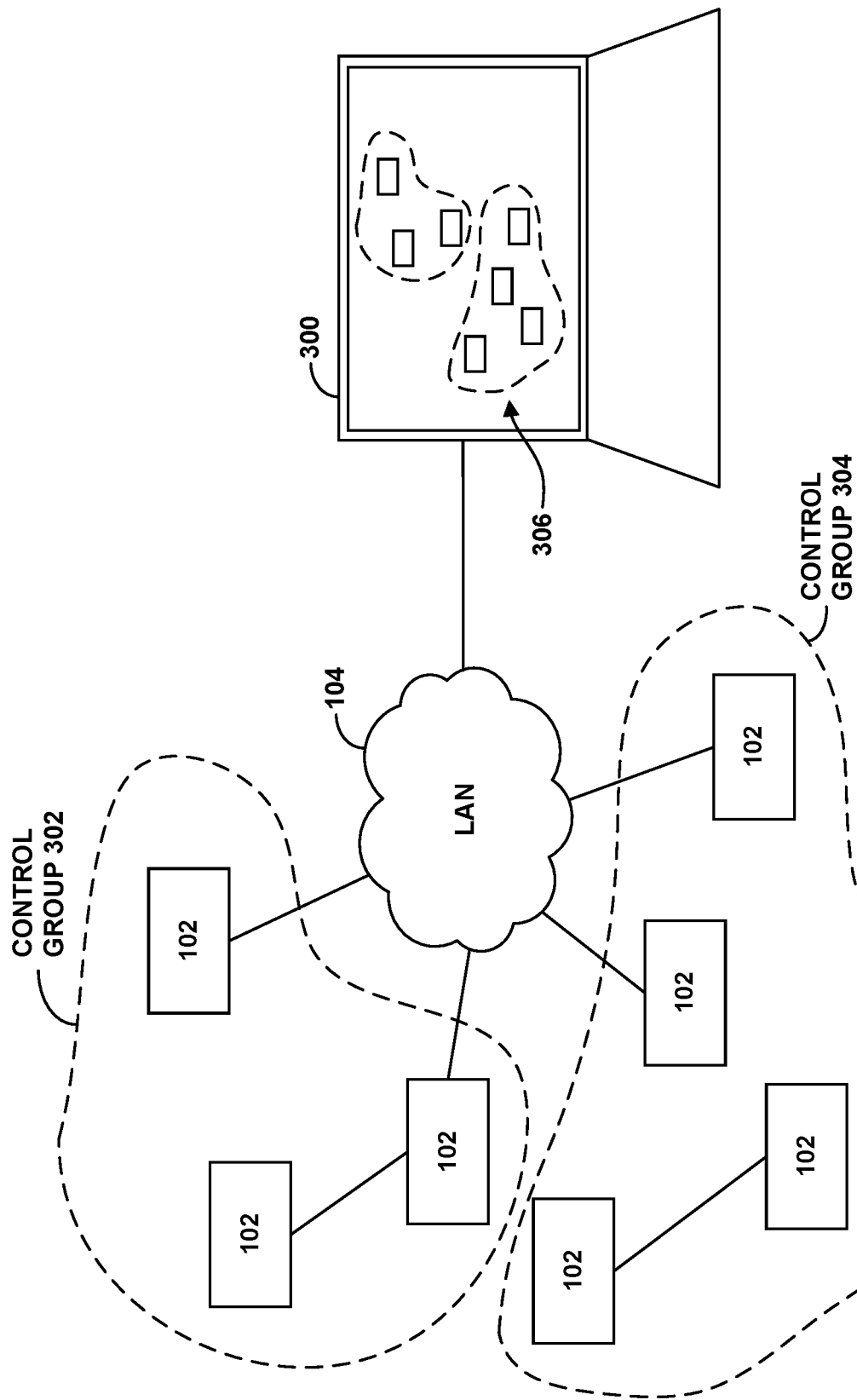
FIG. 3 is a simplified block diagram illustrating an example device provisioning system for provisioning control groups in example implementations.

In an example implementation, a personal computer, OTT device, or other computing system (which could be one of the devices 102 at the customer premises 100) could provide a user interface through which a user could provide input to define one or more such control groups. For instance, a personal computer at the customer premises 100 could execute a locally-stored configuration application or a browser-based configuration application, which could allow a user of the computer to define such control groups. FIG. 3 illustrates this arrangement by way of example, with a computer 300 that may be in LAN communication with the various devices 102 to define example control groups 302.

Executing this configuration application, the computer 300 may first discover the presence of each of various devices 102 at the customer premises, perhaps based on advertisements from the devices as discussed above, and may then present to the user a GUI 306 that lists or otherwise depicts the various devices 102 and allows the user to group the devices 102 into one or more control groups with associated inter-device interrelationships. The computer 300 may then receive user input specifying one or more desired groups of the devices 102 and, for each group, specifying desired functional interrelationships between devices in the group. Once the computer 300 receives user input defining a given such control group, possibly then upon receipt of a user directive to send the control group data to the devices 102, the computer 300 may then provision the devices 102 of the control group with the associated control-group data. For instance, the computer 300 may generate and transmit to each such device a set of control-group data that defines the control group, and each recipient device may store that control-group data and then operate accordingly.

In executing the configuration application, the computer 300 may discover configuration and capabilities data of each of the devices 102 at the customer premises 100, by querying the devices and/or through lookups keyed to the devices' identifiers, among other possibilities. The computer 300 may then present to the user information about the configuration and capabilities respectively of each device, to assist the user in defining one or more control groups and functional interrelationships. Further, the computer 300 may limit device grouping and definitions of functional interrelationships based on this data. For instance, the computer may restrict grouping to devices of a common brand. Additionally or alternatively, the computer may restrict functional interrelationships based on device capabilities to control, to be controlled, or the like. In addition, the computer could suggest possible device groupings and functional interrelationships based on the configuration and capability data.

Figure 4:
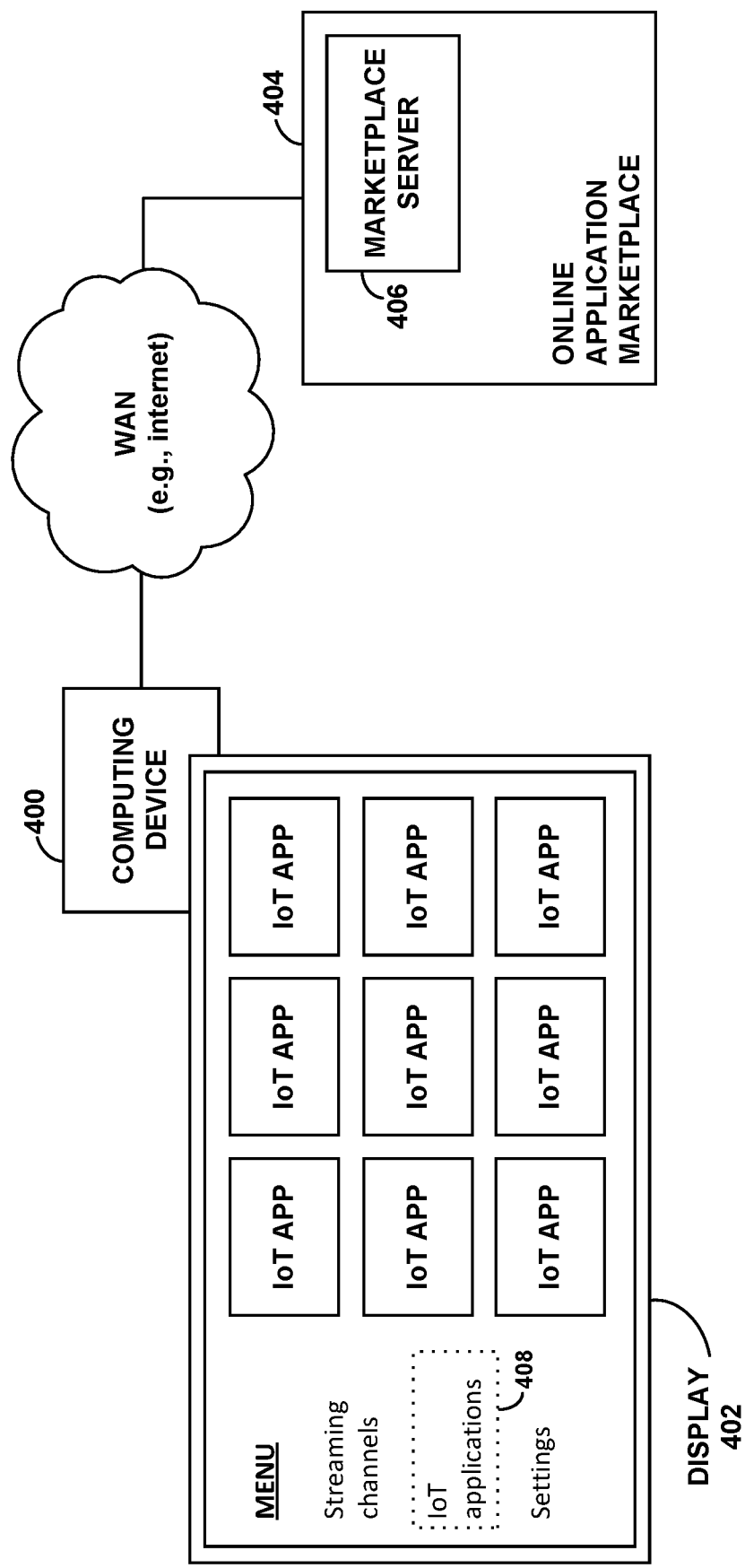
FIG. 4 is a simplified block diagram illustrating an example online application marketplace system for provisioning devices in an example implementation.

In another example implementation, a personal computer, OTT device, or other computing device (e.g., possibly one of the devices 102) could provide a user interface through which a user could download an IoT application from an online application marketplace, to facilitate associated provisioning the devices 102 with associated control-group data. FIG. 4 illustrates an example of such arrangement, where a computing device 400 is coupled with a display 402 and is in WAN communication with an online application marketplace 404.

An example online application marketplace 404 may be operated by a service provider and hosted at a marketplace server 406, such as a web server or other cloud-based computing system, enabling the online application marketplace 404 to be accessed by a web browser or other such application executed by the computing device 400. The online application marketplace 404 may provide the computing device 400 with a GUI for presentation on the display 402, which may list IoT applications offered by that service provider and/or IoT applications offered by various third party providers. Further, the online application marketplace 404 may charge a fee for the user to acquire some or all of these IoT applications, or the online application marketplace 404 may allow user to acquire some or all of the IoT applications for free.

In an example implementation, the online application marketplace 404 could be hosted by an OTT service provider, and the computing device 400 could be an OTT device such as a streaming media player for instance. As noted above, an OTT device may generally interwork with an OTT server and present on a display a GUI that defines a menu of available streaming media channels and the like. Such an OTT system could be enhanced to further include in its menu an IoT-applications section 408 that depicts or otherwise lists various IoT applications available for download and that may allow a user to drill down to learn specifics about each IoT application. Upon navigating to this IoT-applications section 408, the user may thus browse through the available IoT applications and may select a desired IoT application to download. The OTT device may then responsively signal the user's selection to an OTT server of the online application marketplace 404, to cause the OTT server to download to the OTT device the selected IoT application, possibly in exchange for user payment.

Each of one or more IoT applications accessible through this online application marketplace 404 could define respective groupings of devices and/or respective functional inter-relationships between devices, i.e., functional device interrelationships, with different IoT applications possibly defining different such groupings and/or different such functional interrelationships. For instance, each IoT application may define control-group data as discussed above respectively for each of one or more control groups of devices.

When a user interacts with the computing device 404 to select and download from the online application marketplace 404 a desired IoT application, the computing device 400 may then receive that IoT application and install the IoT application on associated devices at the customer premises 100. For instance, for each control group defined by the IoT application, the computing device 400 may transmit to each device in the control group a copy of the control-group data that defines the grouping and interrelationships of devices in the control group. The devices in each such control group may thus receive and store this control-group data and proceed to operate in accordance with the control-group data. For instance, the control-group data could give each such device information about the identity (e.g., address) of each other device with which the device is to communicate, as well as program logic executable to define how the device is to interact with each such other device.

To facilitate this, the marketplace server 406 and/or the computing device 400 could tailor the user-selected IoT application based on the devices 102 present at the customer premises 100. For instance, as stored in the online application marketplace 404, various IoT applications may include placeholders for the devices in each of one or more control groups, and the marketplace server 406 and/or the computing device 400 could replace these placeholders with identifiers of the actual devices 102 present at the customer premises 100.

For example, assume that an IoT application as stored at the online application marketplace 404 defines a control group including a placeholder controlling device $C_P$ and an unspecified number n of placeholder controlled devices $D1_{P(1 \ldots n)}$ and that the IoT application defines a functional interrelationship between these placeholder devices, namely, that when the controlling device $C_P$ receives primitive user input such as a button press, the controlling device $C_P$ should signal to each of the placeholder controlled devices $D1_{P(1 \ldots n)}$ to toggle their respective power state, e.g., to turn them on or off. Further, assume that the devices 102 at the customer premises 100 include a pushbutton controlling device C1, two lightbulbs L1 and L2, and a fan F1. When a user opts to download this IoT application from the online application marketplace 404 to the computing device 400, the marketplace server 406 and/or the computing device 400 could customize the IoT application based on the devices 103 actually present at the customer premises 100, such as by replacing the placeholder $C_P$ with an identity of the pushbutton controlling device C1 actually present at the customer premises 100 and replacing the placeholder $D1_{P(1 \ldots n)}$ with identities of the lightbulbs L1 and L2 and fan F1 actually present at the customer premises 100.

To facilitate tailoring the IoT application based on the devices 102 actually present at the customer premises 100, the computing device 400 could discover the presence of the devices 102 at the customer premises 100 and could learn the configuration and capabilities of those devices, in the manner discussed above for instance. For example, the computing device 400 may discover presence of the devices 102 based on advertisements from the devices as discussed above, and the computing device 400 may discover configuration and capabilities data of the devices 102 by querying the devices 102 and/or through lookups keyed to the devices' identifiers, among other possibilities. The computing device 400 may then provide this information to the marketplace server 406, enabling the marketplace server 406 to tailor the selected IoT application to be specific to the devices actually present at the customer premises. Alternatively, upon download the selected IoT application, the computing device 400 itself may so tailor the IoT application.

When a computing system such as server 406 and/or device 400 tailors the selected IoT application based on devices 102 actually present at the customer premises 100, if any ambiguity exists, the system could prompt the user for input to help resolve the ambiguity, and/or the system could consider one or more other factors as a basis to resolve the ambiguity. For instance, with the example above, if there are two control devices C1 and C2 at the customer premises, at issue may be which of those control devices should be the control device specified in place of the placeholder controlling device $C_P$. In this situation, possibly through interaction with the marketplace server 406, the computing device 400 may prompt the user to select which of control devices C1 and C2 should be the controlling device that would control lightbulbs L1 and L2 and fan F1. Alternatively or additionally, the marketplace server 406 and/or computing device 400 may select between control devices C1 and C2 based on factors such as which control device is a newer model, which control device is a same brand as the controlled devices, and/or which control device is located closer to the controlled devices, among other possibilities.

Further, as noted above, the online application marketplace 400 could be configured to tailor which one or more IoT applications it will present to the user in the first place (e.g., in an IoT-applications section of a user-navigable menu) based on what devices 102 are present at the customer premises 100. For instance, before or at the time the user operates the computing device 400 to visit the online application marketplace 404, the computing device 400 could discover the presence and configuration and capabilities of various devices 102 at the customer premises 100 as noted above. The computing device 400 could then report this information to the marketplace server 406, and the marketplace server 406 could select IoT applications to list based on which IoT applications may work with the indicated devices 102 present at the customer premises 100.

In an example implementation, the marketplace server 406 could determine through this process that devices 102 at the customer premises 100 are of a particular brand, and based on that determination, the marketplace server 406 could list as available IoT applications one or more IoT applications of the same brand—e.g., provided by the same manufacturer as the devices 102. As another example, the marketplace server 406 could determine through this process that devices 102 at the customer premises 100 are configured for a particular use, and based on that determination, the marketplace server 406 could list as available IoT applications one or more IoT applications designed for that particular use. For instance, the marketplace server 406 could determine through this process that devices 102 at the customer premises 100 are devices that would work with a security system, such as window or door sensors, motion sensors, smoke sensors, alarms, and reporting modules, among other possibilities, and based on this determination, the marketplace server 406 could list as available IoT applications one or more security applications that would facilitate coordinated interoperation of those devices to function as a working security system at the customer premises. Other examples could be possible as well.

In yet another example implementation, devices 102 at the customer premises could be provisioned through manual pairing into control groups with associated interrelationships. For instance, a user may manually pair a given switch with a given smart outlet by putting both the switch and smart outlet into a pairing mode in which the devices would engage in signaling with each other to discover each other's presence and establish a mutual control relationship. Through this process, the switch could become a controlling device for the outlet, configured to respond to primitive user input such as a button press by toggling the outlet between outputting power and not outputting power. Further, through this process, both the switch and outlet could establish and store associated control-group data that specifies the switch and outlet as members of a common control group and defines the functional interrelationship between the switch and the outlet. In this example, if either device is already a member of a control group, this process may involve that device responding to the pairing by updating the control-group data for the control group, to add the other device to the control group and to indicate the newly defined functional interrelationship.

As further discussed above, the devices in a control group could update each other, or could otherwise be updated, when their control-group data changes. For instance, when a device detects a change to its stored control-group data, the device may generate and transmit to each other device in its control group an update message that provides the other device with an updated copy of the control-group data and/or information about the change. Each recipient device in the control group may accordingly update its own copy of the control-group data to reflect any such changes.

Changes to the control-group data could take various forms, such as but not limited to changing the set of devices that make up the control group, changing the functional interrelationship between devices of the control group, and/or changing the state of a device in the control group.

Figure 5:
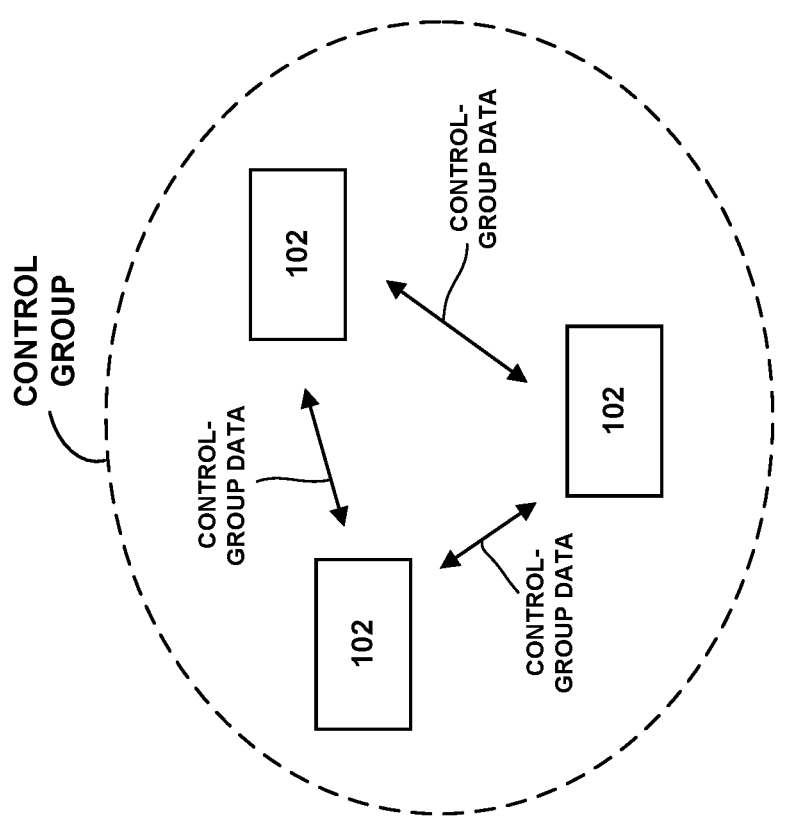
FIG. 5 is a simplified block diagram illustrating example sharing of control-group data among devices of a control group.

FIG. 5 illustrates an example of this process with a control group including three devices 102. In this example, if the control-group data at one of the three devices 102 changes, that device may responsively signal to each other device 102 to provide an updated copy of the control-group data, for storage by each recipient device. Alternatively, the device that detects the change may signal the change to one other device, which may in turn signal the change to the remaining device, likewise for updating of the control-group data at each device.

As another example, consider the example control group G1 discussed above consisting of motion sensor M1, switch S1, and a first lightbulb L1, and assume that a second lightbulb L2 is added to the control group, to be controlled along with the first lightbulb L1 by switch S1 in response to primitive user input or motion sensing. For instance, assume that a user manually pairs S1 with L2 or adds L2 to the control group through a user interface as discussed above. When this happens, the control-group data in S1 may be updated to add L2 as an additional device in the control group, and S1 may respond to that change in its control-group data by updating the control-group data at each other member of the control group.

For instance, S1 could transmit to each of M1, L1, and L2 a control signal that provides the updated control-group data for group G1, and each recipient device could store that control-group data as new control-group data for the group.

Alternatively, S2 may transmit to each such device an indication of one or more incremental changes to make to already-stored control-group data. Through this or other processing, each device in the control group could thus obtain and store as its control-group data for control group G1 a current set of control-group data that specifies as members of the control group M1, S1, L1, and L2, and that defines the functional interrelationships between these devices. Although this updated control-group data may not impact the operation of M1 and L1 in any way, M1 and L1 would still then be provisioned with the current control-group data for control group G1.

As another example, with example control group G1 consisting of motion sensor M1, switch S1, and lightbulb L1, when the state of L1 changes, the control-group data at each member of the control group could be updated accordingly, again even if updating the control group data does not impact operation of a given such device.

For instance, the control-group data as stored at each of these devices may indicate that L1 is currently powered off. When S1 then turns on L1, both S1 and L1 may responsively update their copy of the control-group data to indicate that L1 is turned on. Further, S1 and/or L1 may respond to this change of state by signaling to M1 to update the control-group data at M1 accordingly as well. For instance, both S1 and L1 may signal to M1 to provide M1 with an updated copy of the control-group data indicating that L1 is turned on, or to provide M1 with notification that L1 is turned on, and M1 may accordingly revise its stored control-group data for group G1 to indicate that status.

Alternatively, if lightbulb L1 turns on through other means (e.g., by control of another switch or through other action), L1 may update its control-group data accordingly to indicate that L1 is turned on, and L1 may responsively signal to the other members of the control group to inform them of the change of state of L1 and to cause them to update their control-group data accordingly as well.

As noted above, synchronizing the control-group data among the members of a control group in this or another manner could beneficially enable restoring of the control-group data at a member of the control group after that member is intentionally or unintentionally taken out of service and/or otherwise loses its control-group data. For instance, if lightbulb L1 in the example control group G1 somehow loses its control-group data, motion sensor M1 and/or switch S1 could restore the control-group data in L1 by transmitting to L1 a copy of the most current control-group data for group G1 and having L1 store that data and proceed to operate accordingly.

To facilitate this, as noted above, when a device that was taken out of service comes back into service, the device may broadcast a probe message or the like to which one or more other devices could respond by providing the device with a copy of the latest control-group data for storage and use. Further, various members of the control group may engage in heartbeat signaling with each other and may use the heartbeat signaling as a basis to discover when other devices go out of service and come back into service. For instance, when a first device detects a threshold absence of heartbeat signaling from a second device, the first device may conclude that the second device has dropped out of service. When the first device then newly detects heartbeat signaling from the second device, the first device may conclude that the second device has come back into service. At that point, the first member may then responsively transmit to the second device a copy of the control-group data for storage and use by the second device.

In addition, as noted above, in a scenario where multiple control groups are defined at the customer premises 102, the control groups could share with each other their respective control-group data and could thus store each other's control-group data in addition to their own control-group data. Thus, each device 102 at the customer premises 100 could store each control group's data.

Each device could store this data in an XML document and/or other manner. For instance, an XML document stored at each device could include an object or other section respectively per control group, keyed to a unique identifier of the control group, which could include for each control group information such as (i) identities, configurations, and capabilities of devices that are members of the control group, (ii) functional interrelationships between the devices in the control group, including possibly program logic executable per device to implement those functional interrelationships, and (iii) operational states of devices in the control group.

Figure 6:
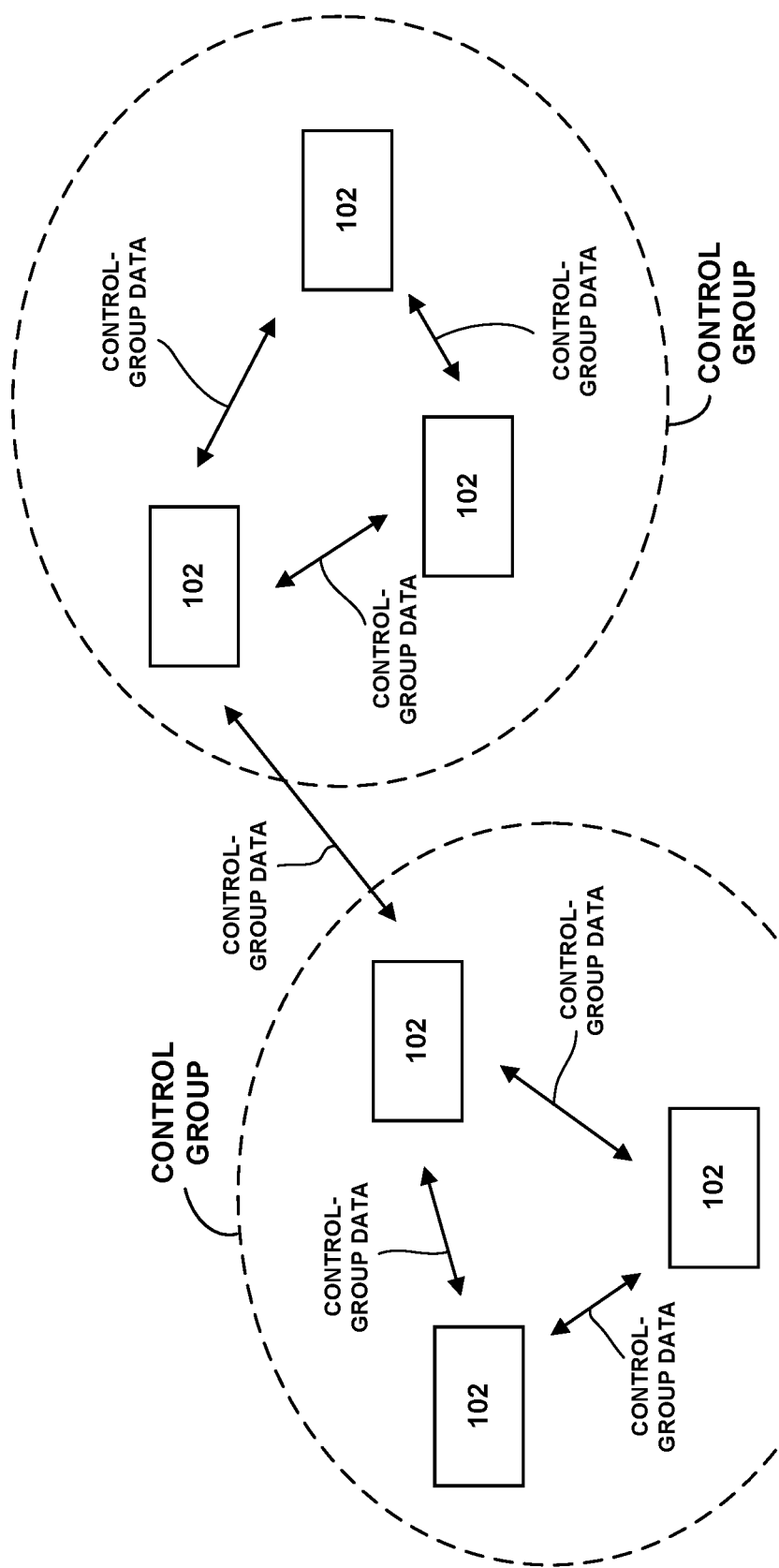
FIG. 6 is a simplified block diagram illustrating example sharing of control-group data among devices of a control group and between control groups.

Similar to the process described within a given control group, when the control-group data of a control group changes, one or more of the devices in that control group could respond to that change by updating the control-group data at one or more devices of another control group. FIG. 6 illustrates this process by way of example, with two control groups and with sharing of control-group data among devices within each control group and also between the control groups.

As a specific example, consider a scenario where two control groups G1 and G2 are defined at the customer premises, with control group G1 including a switch S1 and lightbulb L1 and the switch S1 being configured to control the lightbulb, and with control group G2 including other devices that have no functional interrelationship with the devices in group G1. In this scenario, the devices of group G1 could maintain both the control-group data of group G1 and the control-group data of group G2, and the devices of group G2 could likewise maintain both the control-group data of group G2 and the control-group data of group G1.

With this example, if the membership of group G1 changes or the state of lightbulb L1 changes as discussed above, not only might the devices in group G1 share this change with each other so that they would each store updated control-group data for group G1, but each of one or more devices in group G1 may also transmit to each of one or more members of group G2 the updated control-group data of group G1, and the devices in of control group G2 may likewise share this updated control-group data with each other, so that they would each store not only the current control-group data of their own control group but also the current control-group data of control group G1.

As with the in-group synchronizing of control-group data discussed above, synchronizing of control-group data between control groups may also enable restoring of the control-group data after a device is intentionally or unintentionally taken out of service and/or otherwise loses its control-group data. For instance, if the devices of a control group somehow lose their control-group data, one or more devices of another control group could re-provision them with the latest control-group data. As with the implementation above, this could occur based on probes or heartbeat messaging.

As further noted above, the functional interrelationship between devices at the customer premises may be changed dynamically, based on various factors such as but not limited to time and/or location. This dynamic changing could involve determining and responding to a current time and/or a current location of one or more devices by dynamically changing control-group pairings between devices and/or by changing what action a device will take in response to a trigger event such as receipt of primitive user input for instance. Further, this dynamic changing could be carried out by a computing system, such as one of the involved devices and/or another system such as a personal computer or OTT device for instance.

To appreciate how this dynamic changing could work in practice, consider an example scenario where a simple controlling device has a pushbutton and is configured with control logic that causes the controlling device to respond to a user pressing that pushbutton by toggling the on/off state of a particular lightbulb L1. For instance, the controlling device may be configured with control-group data that includes program instructions executable by a processor of the controlling device to cause the controlling device to detect when the pushbutton is pressed and to respond to pressing of the pushbutton by generating and transmitting to lightbulb L1 a control signal to which lightbulb L1 is configured to respond by toggling between its on and off states.

In an example implementation, the controlling device could be configured with additional control logic that causes the controlling device to use time and/or location as a basis to dynamically control which of multiple devices the controlling device will control in response to detecting user pressing of the pushbutton. For instance, the controlling device could be configured with additional program instructions executable by a processor of the controlling device to cause the controlling device to engage in this dynamic control.

According to an example of this additional control logic, when the controlling device detects pressing of the pushbutton, the controlling device may determine a current time and/or a current location and, based on the determined time and/or location, may control whether to respond to the detected pushing of the pushbutton by toggling the on/off state of lightbulb L1 or rather by toggling the on/off state of lightbulb L2. If the controlling device determines that the time is a first time (e.g., in a first time range) rather than a second time (e.g., in a second time range) and/or that the location is a first location (e.g., in a first location area) rather than a second location (e.g., in a second location area), then, based on that determination, the controlling device may respond to the pressing of the pushbutton by toggling the on/off state of L1 rather than by toggling the on/off state of L2. Whereas, if the controlling device determines that the time is the second time rather than the first time and/or that the location is the second location rather than the first location, then the controlling device may respond to the pressing of the pushbutton by toggling the on/off state of L2 rather than by toggling the on/off state of L1.

Alternatively, according to this control logic, the controlling device could regularly monitor the time and/or location and, upon detecting that the time and/or location meets one or more conditions, may dynamically configure which device(s) the controlling device will control in response to detecting pressing of the pushbutton. For instance, if and when the controlling device determines that the time the first time rather than the second time and/or that the location is the first location rather than the second location, the controlling device may responsively configure itself to be set to respond to pressing of the pushbutton by toggling the on/off state of lightbulb L1 rather than by toggling the on/off state of lightbulb L2. Whereas, if and when the controlling device determines that the that the time is the second time rather than the first time and/or that the location is the second location rather than the first location, the controlling device may responsively configure itself to be set to respond to pressing of the pushbutton by toggling the on/off state of lightbulb L2 rather than by toggling the on/off state of L1.

The controlling device may so configure itself in various ways. For instance, the controlling device may so configure itself by changing its control-group data accordingly. Further, as discussed above, upon changing its control-group data, the controlling device may also update each other device of its control group and perhaps one or more other devices of one or more other control groups.

In another example implementation, the controlling device could be configured with additional control logic that causes the controlling device to use time and/or location as a basis to dynamically control the manner in which the controlling device will control lightbulb L1 in response to detecting user pressing of the pushbutton, such as what the controlling device would cause the lightbulb L1 to do in response to detecting user pressing of the pushbutton. For instance, the controlling device could be configured with additional program instructions executable by a processor of the controlling device to cause the controlling device to engage in this dynamic control as well, and the controlling device could likewise engage in this dynamic control in response to detecting pressing of the pushbutton or in advance based on an ongoing evaluation of time and/or location.

According to an example of this additional control logic, for instance, the controlling device could use the current time and/or location as a basis to control whether the controlling device will (i) respond to the pressing of the pushbutton by toggling the on/off state of lightbulb L1, (ii) respond to the pressing of the pushbutton by changing the brightness of lightbulb L1 without toggling its on/off state, or (iii) respond to the pressing of the pushbutton by changing the color light emitted by lightbulb L1. For instance, if and when the controlling device determines that the time is a first time and/or that the location is a first location, then the controlling device may responsively set itself to respond to pressing of the pushbutton by toggling the on/off state of lightbulb L1. Whereas if and when the controlling device determines that the time is a second time and/or that the location is a second location, then the controlling device may responsively set itself to instead respond to pressing of the pushbutton by changing the brightness of the lightbulb L1. And whereas, if and when the controlling device determines that the time is a third time and/or that the location is a third location, then the controlling device may responsively set itself to instead respond to pressing of the pushbutton by changing the color light emitted by lightbulb L1.

In still another example implementation, another computing system could be configured with control logic to engage in similar monitoring of time and/or location and to use the current time and/or location as a basis to reconfigure the simple pushbutton controlling device. For instance, the personal computer or OTT device discussed above could be configured with program instructions executable by a processor to determine time and/or location and, based on the determined time and/or location, to transmit to the controlling device a directive to which the controlling device is configured to respond by configuring itself accordingly.

According to an example of this control logic, if and when the computing system determines that the time is the first time rather than the second time and/or that the location is the first location rather than the second location, the computing system may direct and thus cause the controlling device to be configured such that the controlling device would respond to the pressing of the pushbutton by toggling the on/off state of lightbulb L1 rather than by toggling the on/off state of lightbulb L2. Whereas, if and when the computing system determines that the time is the second time rather than the first time and/or that the location is the second location rather than the first location, the computing system may direct and thus cause the controlling device to be configured such that the controlling device would respond to the pressing of the pushbutton by toggling the on/off state of lightbulb L2 rather than by toggling the on/off state of lightbulb L1.

Alternatively, according to an example of this control logic, if and when the computing system determines that the time is the first time and/or that the location is the first location, the computing system may direct and thus cause the controlling device to be configured such that the controlling device would respond to the pressing of the pushbutton by toggling the on/off state of lightbulb L1. Whereas, if and when the computing system determines that the time is the second time and/or that the location is the second location, the computing system may direct and thus cause the controlling device to be configured such that the controlling device would respond to the pressing of the pushbutton by changing the brightness level of lightbulb L1. And whereas, if and when the computing system determines that the time is the third time and/or that the location is the third location, the computing system may direct and thus cause the controlling device to be configured such that the controlling device would respond to the pressing of the pushbutton by changing the color light emitted by lightbulb L1.

The determined time in these or other processes could be a current time of day, day, week, month, year, season, and/or other time, by reference to a clock or other measure of time. For instance, the controlling device itself could be programmed with a clock to which the controlling device could refer to determine the time and to then use the time as a basis to dynamically control its functional interrelationship with one or more other devices. Further, a separate computing system such as the personal computer or OTT device discussed above, could likewise be programmed with a clock to which it could refer to determine the current time and to use that time as a basis to dynamically control the controlling device's functional interrelationship with one or more other devices.

The determined location in these or other processes could be a physical location of the controlling device and/or a physical location of one or more other associated devices, such as the location of a controlled device. Examples of such location could be absolute or relative physical position such as geographic location, street address, floor, room, or other position. A device such as the controlling device may be able to determine its own location in various ways, such as by using wireless beacons from nearby WiFi access points or the like (e.g., by triangulation), through use of a global navigation satellite system, through dead reckoning, and/or other means. The controlling device may then use that determined location as a basis for the dynamic control, such as by comparing the determined location to a predefined map or other such data, to determine whether the location falls within a predefined location area, and exerting the control based on that determination. Further, a separate computing system may determine the location of the controlling device by querying the controlling device or through other means as well.

As noted above, context factors such as time and/or location could also be used as a basis to dynamically detach a controlling device or otherwise to cause the controlling device to not perform a control action that it may otherwise perform. For instance, a controlling device may normally be configured to respond to a user pressing of a pushbutton by toggling the on/off state of one or more lights. But based on an evaluation of the current time and/or location, the controlling device could be dynamically reconfigured to take no such control action in response to a user pressing the pushbutton.

Further, other factors in addition to or instead of time and/or location could be used as a basis to dynamically change the functional interrelationships of devices, such as to change what other device a given device would control, and/or what type of control it would exert, in response to given primitive user input.

For example, the functional interrelationship could be dynamically changed based on which user engages the controlling device (e.g., as determined by a fingerprint sensor in the controlling device, by user login, and/or by one or more other processes) and/or based on which user is present near the controlling device at the time the controlling device is engaged (e.g., as determined by one or more cameras and computer vision techniques, by wireless signal proximity, and/or by one or more other processes). For instance, the controlling device could be made to perform a first control action rather than a second control action if a first user rather than a second user engages the controlling device or is present near the controlling device at the time, and the controlling device could be made to perform the second control action rather than the first control action if a second user rather than the first user engages the controlling device or is present near the controlling device at the time.

As another example, the functional interrelationship could be changed based on the weather (e.g., as determined based on a query to a weather service), and/or based on various sensor readings. Other examples are possible as well.

Figure 7:
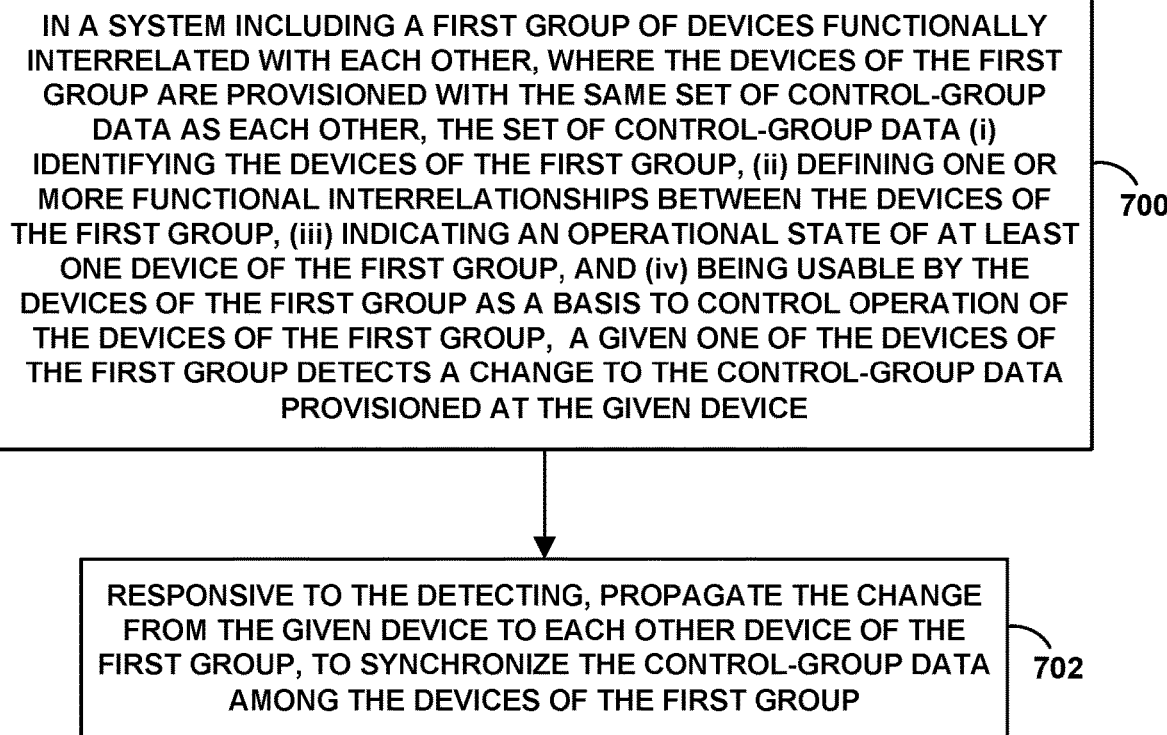
FIG. 7 is a flow chart illustrating an example method that could be carried out in accordance with the disclosure.

FIG. 7 is a flow chart illustrating an example a method that could be carried out in accordance with the present disclosure to provide distributed maintenance of operational data among devices in a plurality of devices, where the plurality of devices includes at least a first group of devices functionally interrelated with each other, where the devices of the first group are provisioned with the same set of control-group data as each other, the set of control-group data (i) identifying the devices of the first group, (ii) defining one or more functional interrelationships between the devices of the first group, and (iii) indicating an operational state of at least one device of the first group, and where the control-group data is usable by the devices of the first group as a basis to control operation of the devices of the first group. This and other methods could be carried out by a given device or by a combination of devices, among other possibilities.

As shown in FIG. 7, at block 700, the method includes a given one of the devices of the first group detecting a change to the control-group data provisioned at the given device. Further, at block 702, the method includes, responsive to the detecting, propagating the change from the given device to each other device of the first group, to synchronize the control-group data among the devices of the first group. Further, as noted above, this synchronizing of the control-group data may facilitate later restoration of the control-group data.

In line with the discussion above, the devices of the first group could include a first device, a second device, and a third device, and the one or more functional interrelationships could include (i) a first functional interrelationship between the first device and the second device and (ii) a second functional interrelationship between the second device and the third device. In that case, the second functional interrelationship could involve the second device controlling an operational state of the third device. Further, the operational state indicated by the control-group data could include the operational state of the third device.

As further discussed above, the control-group data could include control logic executable by the second device to control the operational state of the third device. Further, the operational state of the third device could include an on/off state of the third device. In addition, the change to the control-group data could represent a change of the operational state of the third device, and the act of propagating the change could include propagating the change to the first device. Still further, the change to the control-group data could involve a change of which devices are members of the first group, such as adding a device to the group or removing a device from the group for instance.

As additionally discussed above, the plurality of devices could also include a second group of devices that are functionally interrelated with each other, where the first group and second group may be mutually exclusive, where the devices of the second group are also provisioned with the set of control-group data, the set of control-group data additionally (iv) identifying the devices of the second group, (v) defining one or more functional interrelationships between the devices of the second group, and (vi) indicating an operational state of at least one device of the second group, and where the control-group data is further usable by the devices of the second group as a basis to control operation of the devices of the second group. In that case, the method could further include, responsive to the given device of the first group detecting a change to the control-group data, propagating the change from the first group to the second group, to synchronize the control-group data among the devices of the first group and the devices of the second group. As noted above, the change of the control-group data propagated to the second group could represent a change of the operational state of the at least one device of the first group.

As also discussed above, the method could include provisioning the devices of the first group with the set of control-group data. For instance, this could include downloading the control-group data from an online application marketplace and providing the downloaded control-group data to each device of the first group. Alternatively or additionally, this could involve receiving user input establishing the control-group data and providing the established control-group data to each device of the first group.

In line with the discussion above, a method such as this could be carried out by a computing system, which could include at least one processor, at least one non-transitory data storage, and program instructions stored in the at least one non-transitory data storage and executable by the at least one processor to carry out the method operations, such as by causing the computing system to carry out the operations. Such a system could be provided at a given device or distributed among multiple devices, such as among devices of the first group.

Various other features described herein could be carried out in this context as well, and vice versa.

Figure 8:
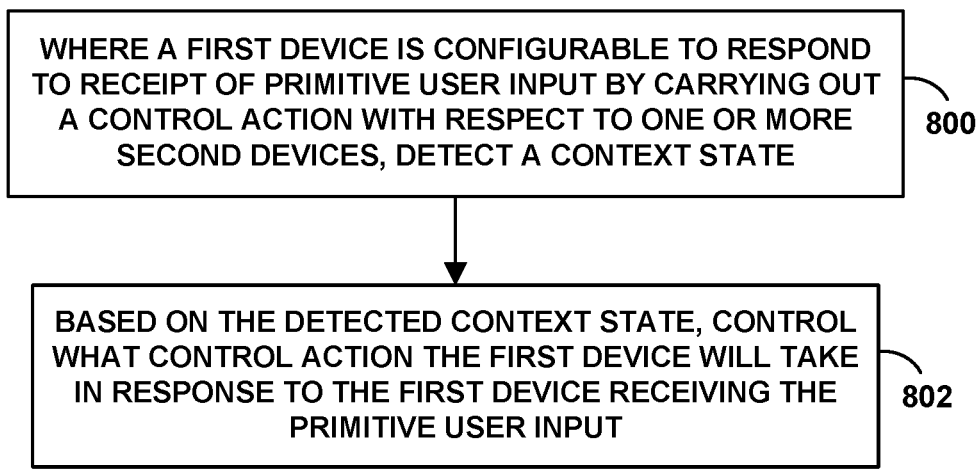
FIG. 8 is another flow chart illustrating an example method that could be carried out in accordance with the disclosure.

FIG. 8 is next a flow chart depicting a method that could be carried out in accordance with the present disclosure for controlling operation of a first device, the first device being configurable to respond to receipt of primitive user input by carrying out a control action with respect to one or more second devices. As shown in FIG. 8, at block 800, the method includes detecting a context state. Further, at block 802, the method includes, based on the detected context state, controlling what control action the first device will take in response to the first device receiving the primitive user input.

In line with the discussion above, the act of receiving the primitive user input could comprise a button of the first device being pressed by a user. Thus, the method could involve using the determined context state as a basis to control what control action the first device will take in response to pressing of that button. Further, the context state could include time and/or location, with the time possibly being time of day and with the location possibly being location of the first device.

As additionally discussed above, the act of controlling what control action the first device will take in response to the first device receiving of the primitive input could involve controlling which second device the first device will control in response to the first device receiving the primitive user input. For instance, this could include (i) if the detected context state is a first state rather than a second state, then causing the first device to respond to the first device receiving the primitive user input by controlling a first second device rather than a second second device, whereas (ii) if the detected context state is the second state rather than the first state, then causing the first device to respond to the first device receiving the primitive user input by controlling the second second device rather than the first second device.

Further, as also discussed above, the act of controlling what control action the first device will take in response to the first device receiving the primitive user input could involve controlling which of multiple operational states of a second device the first device will control in response to the first device receiving the primitive user input. For instance, this could include (i) if the detected context state is a first state rather than a second state, then causing the first device to respond to the first device receiving of the primitive user input by controlling a first operational state of the second device rather a second operational state of the second device, and (ii) if the detected context state is the second state rather than the first state, then causing the first device to respond to the first device receiving the primitive user input by controlling the second operational state of the second device rather than the first operational state of the second device.

As noted above, this method could be carried out by the first device. For instance, the method could be carried out upon the first device receiving the primitive user input. Or the method could be carried out before the first device receives the primitive user input (e.g., the instance at issue), in which case the act of controlling what control action the first device will take in response to the first device receiving the primitive user input could involve configuring the first device to take the control action upon the first device later receiving the primitive user input. Alternatively or additionally, the method could be carried out at least in part by a device other than the first device.

In line with the discussion above, a method such as this could also be carried out by a computing system, which could include at least one processor, at least one non-transitory data storage, and program instructions stored in the at least one non-transitory data storage and executable by the at least one processor to carry out the method operations, such as by causing the computing system to carry out the operations.

Further, an example computing system could comprise a processor programmed with instructions executable by the processor to carry out the operations. Such a computing system could be disposed at the first device, and the instructions could be executable by the processor to carry out the operations upon the first device receiving the primitive user input or before the first device receives the primitive user input, as discussed above. Alternatively or additionally, the computing system could be disposed at least in part at a device other than the first device.

Various other features described herein could be carried out in this context as well, and vice versa.

Figure 9:
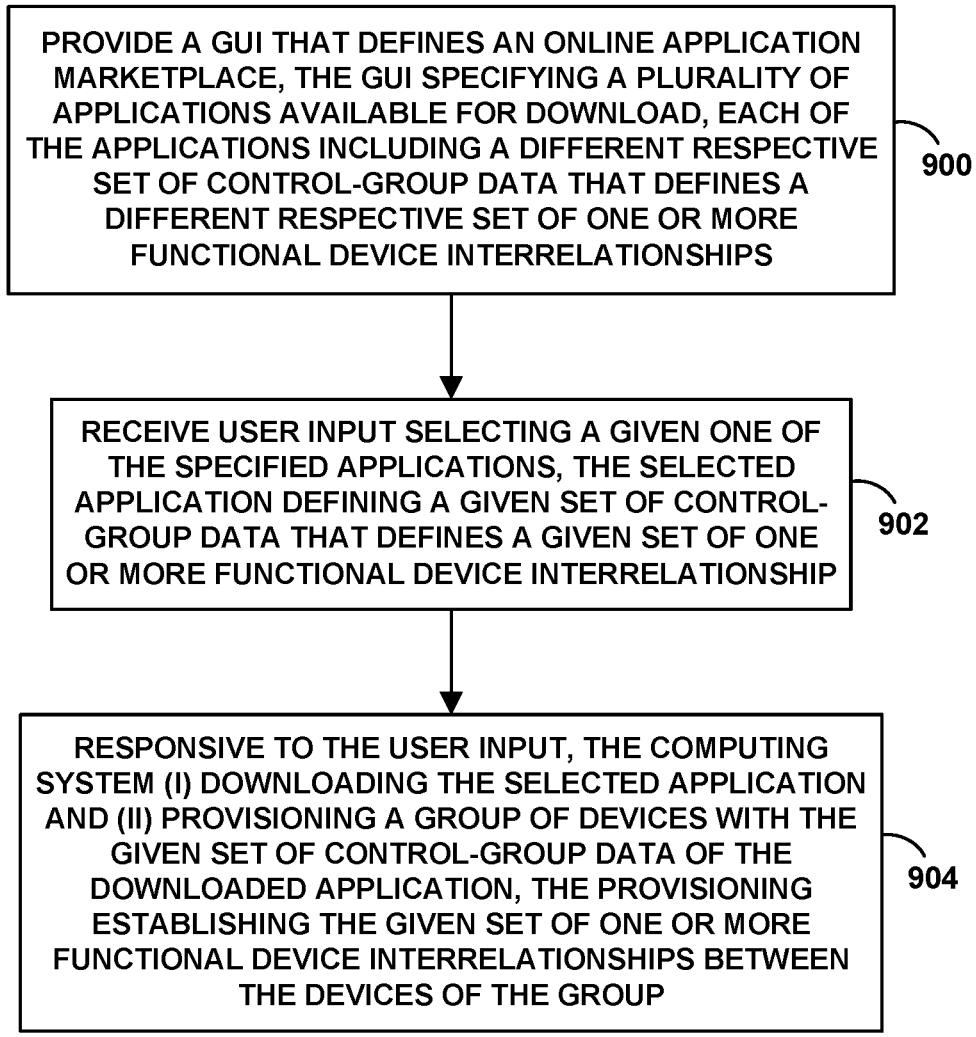
FIG. 9 is another flow chart illustrating an example method that could be carried out in accordance with the disclosure.

FIG. 9 is next a flow chart depicting a method that could be carried out in accordance with the present disclosure for provisioning a group of devices with control-group data defining one or more functional interrelationships between the devices of the group. As shown in FIG. 9, at block 900, the method could include a computing system providing a GUI that defines an online application marketplace, the GUI specifying a plurality of applications available for download, each of the applications including a different respective set of control-group data that defines a different respective set of one or more functional device interrelationships. Further, at block 902, the method includes the computing system receiving user input selecting a given one of the specified applications, the selected application defining a given set of control-group data that defines a given set of one or more functional device interrelationships. And at block 904, the method includes, responsive to the user input, the computing system (i) downloading the selected application and (ii) provisioning the devices of the group with the given set of control-group data of the downloaded application, the provisioning establishing the given set of one or more functional device interrelationships between the devices of the group.

In line with the discussion above, the group of devices could include a first device, a second device, and a third device, and the given set of one or more functional device interrelationships established between the devices of the group could include (i) a first functional interrelationship between the first device and the second device and (ii) a second functional interrelationship between the second device and the third device. Further, the second functional interrelationship could involve the second device controlling an operational state of the third device, such as an on/off state of the third device for instance. And the given set of control-group data of the downloaded application could include control logic executable by the second device to control the operational state of the third device.

As further discussed above, the computing system could include an OTT device, and the act of providing the GUI could involve the OTT device providing the GUI on an associated display, in which case the act of receiving the user input could comprise the OTT device receiving the user input, from a remote control for instance. Further, as noted above, such a GUI could include a menu that allows user selection of streaming media channels and that further allows user selection of an application from among the plurality of applications.

As additionally discussed above, the method could also include controlling which plurality of applications the GUI specifies as available for download, based on information about the devices of the group, such as based on a brand of the devices and/or types of the devices (e.g., configuration and capabilities information of the devices).

Further, as discussed above, the selected application could define device placeholders, and the method could additionally involve substituting the device placeholders for actual identifiers of the devices of the group. Still further, the act of provisioning the devices of the group with the given set of control-group data of the downloaded application could involve provisioning each device of the group with the given set of control-group data of the downloaded application.

In line with the discussion above, a method such as this could also be carried out by a computing system, which could include at least one processor, at least one non-transitory data storage, and program instructions stored in the at least one non-transitory data storage and executable by the at least one processor to carry out the method operations, such as by causing the computing system to carry out the operations.

Various other features described herein could be carried out in this context as well, and vice versa.

Further, the present disclosure also contemplates at least one non-transitory computer-readable medium (e.g., optical, magnetic, or flash storage media) encoded with, embodying, or otherwise storing program instructions executable by at least one processor to carry out various operations as described herein.

Exemplary embodiments have been described above. Those skilled in the art will understand, however, that changes and modifications may be made to these embodiments without departing from the true scope and spirit of the invention.

What is claimed is:

1. A method for provisioning a group of devices with control-group data defining one or more functional interrelationships between the devices of the group, the method comprising:

provided by a computing system a graphical user interface (GUI) defining an online application marketplace, wherein the GUI specifies a plurality of applications available for download, each of the applications including a different respective set of control-group data that defines a different respective set of one or more functional device interrelationships;

receiving into the computing system user input selecting a given one of the specified applications, the selected application defining a given set of control-group data that defines a given set of one or more functional device interrelationships; and responsive to the user input, (i) downloading by the computing system the selected application and (ii) provisioning by the computing system the devices of the group with the given set of control-group data of the downloaded application, wherein the provisioning establishes the given set of one or more functional device interrelationships between the devices of the group, wherein the given set of control-group data defines a placeholder for a controlling device to have a control relationship with at least one controlled device according to which the controlling device is to control operation of the at least one controlled device, and wherein the provisioning by the computing system the devices of the group with the given set of control-group data comprises selecting by the computing system a given controlling device whose identity is to be substituted for the placeholder in the given control-group data, wherein the selecting of the given controlling device is based on the given controlling device being located closer than another controlling device to the at least one controlled device.

2. The method of claim 1, wherein the group of devices includes a first device, a second device, and a third device, wherein the given set of one or more functional device interrelationships established between the devices of the group includes (i) a first functional interrelationship between the first device and the second device and (ii) a second functional interrelationship between the second device and the third device.

3. The method of claim 2, wherein the second functional interrelationship comprises the second device controlling an operational state of the third device.

4. The method of claim 3, wherein the given set of control-group data of the downloaded application includes control logic executable by the second device to control the operational state of the third device.

5. The method of claim 3, wherein the operational state of the third device comprises an on/off state of the third device.

6. The method of claim 1, wherein the computing system comprises an over the top (OTT) device, wherein providing the GUI comprises the OTT device providing the GUI on an associated display, and wherein receiving the user input comprises the OTT device receiving the user input.

7. The method of claim 6, wherein the GUI includes a menu that allows user selection of streaming media channels, the menu further allowing user selection of an application from among the plurality of applications.

8. The method of claim 1, further comprising controlling which plurality of applications the GUI specifies as available for download, based on information about the devices of the group.

9. The method of claim 8, wherein the information comprises a brand of the devices of the group.

10. The method of claim 8, wherein the information comprises types of the devices of the group.

11. The method of claim 1, wherein the selected application defines device a plurality of placeholders including the placeholder for the controlling device, the method further comprising substituting, for the device placeholders, actual identifiers of the devices of the group.

12. The method of claim 1, wherein provisioning the devices of the group with the given set of control-group data of the downloaded application comprises provisioning each device of the group with the given set of control-group data of the downloaded application.

13. A computing system for provisioning a group of devices with control-group data defining one or more functional interrelationships between the devices of the group, the computing system comprising:
   at least one processor;
   at least one non-transitory data storage;
   program instructions stored in the at least one non-transitory data storage and executable by the at least one processor to cause the computing system to carry out operations including:
      providing a graphical user interface (GUI) defining an online application marketplace, wherein the GUI specifies a plurality of applications available for download, each of the applications including a different respective set of control-group data that defines a different respective set of one or more functional device interrelationships,
      receiving user input selecting a given one of the specified applications, the selected application defining a given set of control-group data that defines a given set of one or more functional device interrelationships, and
      responsive to the user input, (i) downloading the selected application and (ii) provisioning the devices of the group with the given set of control-group data of the downloaded application, wherein the provisioning establishes the given set of one or more functional device interrelationships between the devices of the group,
      wherein the given set of control-group data defines a placeholder for a controlling device to have a control relationship with at least one controlled device according to which the controlling device is to control operation of the at least one controlled device, and wherein the provisioning by the computing system the devices of the group with the given set of control-group data comprises selecting by the computing system a given controlling device whose identity is to be substituted for the placeholder in the given control-group data, wherein the selecting of the given controlling device is based on the given controlling device being located closer than another controlling device to the at least one controlled device.

14. The computing system of claim 13, wherein the group of devices includes a first device, a second device, and a third device, wherein the given set of one or more functional device interrelationships established between the devices of the group includes (i) a first functional interrelationship between the first device and the second device and (ii) a second functional interrelationship between the second device and the third device.

15. The computing system of claim 14, wherein the second functional interrelationship comprises the second device controlling an operational state of the third device.

16. The computing system of claim 15, wherein the given set of control-group data of the downloaded application includes control logic executable by the second device to control the operational state of the third device.

17. The computing system of claim 13, wherein the computing system comprises an over the top (OTT) device, wherein providing the GUI comprises the OTT device providing the GUI on an associated display, and wherein receiving the user input comprises the OTT device receiving the user input.

18. The computing system claim 17, wherein the GUI includes a menu that allows user selection of streaming media channels, the menu further allowing user selection of an application from among the plurality of applications.

19. The computing system of claim 13, wherein the operations additionally include controlling which plurality of applications the GUI specifies as available for download, based on information about the devices of the group.

20. At least one non-transitory computer-readable medium having stored thereon program instructions executable by at least one processor to carry out operations for provisioning a group of devices with control-group data defining one or more functional interrelationships between the devices of the group, the operations comprising:
   providing a graphical user interface (GUI) defining an online application marketplace, wherein the GUI specifies a plurality of applications available for download, each of the applications including a different respective set of control-group data that defines a different respective set of one or more functional device interrelationships;
   receiving user input selecting a given one of the specified applications, the selected application defining a given set of control-group data that defines a given set of one or more functional device interrelationships; and
   responsive to the user input, (i) downloading the selected application and (ii) provisioning the devices of the group with the given set of control-group data of the downloaded application, wherein the provisioning establishes the given set of one or more functional device interrelationships between the devices of the group, wherein the given set of control-group data defines a placeholder for a controlling device to have a control relationship with at least one controlled device according to which the controlling device is to control operation of the at least one controlled device, and wherein the provisioning by the computing system the devices of the group with the given set of control-group data comprises selecting by the computing system a given controlling device whose identity is to be substituted for the placeholder in the given control-group data, wherein the selecting of the given controlling device is based on the given controlling device being located closer than another controlling device to the at least one controlled device.

* * * * *